INVENTOR.
Paul K. Weimer
BY
ATTORNEY

INVENTOR.
Paul K. Weimer
BY [signature]
ATTORNEY

THE ABOVE EXAMPLE
$\chi = .36$
$\frac{\chi}{1-\chi} = .56$

INVENTOR.
Paul K. Weimer
BY
ATTORNEY

INVENTOR.
Paul K. Weimer
BY Otis J. Mitchell
ATTORNEY

United States Patent Office 2,864,887

Patented Dec. 16, 1958

2,864,887

CIRCUITS COMPENSATING FOR PHOTOCONDUCTIVE LAYER LAG IN PICKUP TUBES

Paul K. Weimer, Princeton, N. J., assignor to Radio Corporation of America, a corporation of Delaware Application August 25, 1953, Serial No. 376,397

4 Claims. (Cl. 178—7.2)

This invention relates to arrangements for operating television image pickup tubes and more particularly to compensation means for reducing the "lag" in photoconductive tubes.

Television camera pickup tubes generate a television signal whose amplitude varies with time in accordance with the spacial variation of light from a given object or scene which is to be transmitted. Such tubes depend for their operation on either photo-emissive effects or photoconductive effects.

The Vidicon depends for its operation on photo-conductive effects. As light from an image impinges upon a photo-sensitive layer on the electron beam target area, a charge is stored in accordance with the intensity of the light imaged upon the photo-sensitive layer. This stored charge is released by the neutralizing effect of an electron scanning beam which scans across the stored charge. As the stored charge is released a signal is produced in the output circuit of the Vidicon by the release of the electrons bound in the target area signal plate by the stored charge. The video signal produced by the neutralizing effect of the electron beam fluctuates rapidly in amplitude as the beam passes across the target. Circuits having a pass band of about 4 megacycles are required for transmission of the video signal.

The inability of a pickup tube to respond rapidly to changes in scene is known as "lag." Lag in the Vidicon may be produced by either capacitive or photo-conductive effects.

Capacitive lag results from the fact that the current, which is released by the target due to the neutralizing effect of the scanning beam, falls off exponentially with the voltage produced by the variation of light intensity so that during discharge the target approaches its zero or dark potential very slowly. This effect becomes pronounced when the capacity of the photo-conductor is quite large. Since increased resolution requires more surface area of a target and while sensitivity requires a thinner photo-conductive layer, it becomes quite apparent that the problem of capacitive lag is serious.

Photo-conductive lag results from the failure of the photo-conductive current to follow rapid changes in light intensity. At the present time this lagging effect is believed to be due to the imperfections of the crystalline structure of the photo-conductor, which results in the trapping of electrons at these discrete points of imperfection. When the target is exposed to some given light source the resulting target current does not approach or reach its maximum value for the given intensity of light until these traps have been completely filled with electrons. When the light source is removed the output signal current continues for an appreciable period of time until the trapped electrons have been completely released.

The effect of the capacitive and photo-conductive lag is to create the overlapping or superimposing of several video signals comprising those that are desirable and those which are not desirable. This effectively creates several types of illusions, one of which would be the transparency of a solid object upon being promptly projected into a given scene or a streaking effect upon the immediate removal of a bright object from one fixed location to another, giving the effect of a comet. The "panning" action of a studio camera in moving from one given scene to another may also create the false illusion of a transparency, and lack of sharpness of detail.

According to this invention, a signal derived from a video camera is stored for a complete scanning period (equivalent to 1/30 of a second for U. S. standards) reduced in amplitude by a predetermined amount and subsequently added with reversed phase to the original video output signal. The signal storing may be accomplished by either external means or by the use of the pickup tube such as the Vidicon itself.

A primary object of this invention is to improve the transmission of television pictures.

Another object of this invention is to reduce the effect of capacitive lag in storage type pickup tubes such as the orthicon or Vidicon.

Another object of this invention is to reduce the effect of photoconductive lag in photoconductive targets of Vidicon tube.

Other objects of the invention will become apparent from a reading of the specification in connection with the accompanying drawings, wherein.

Figure 1:
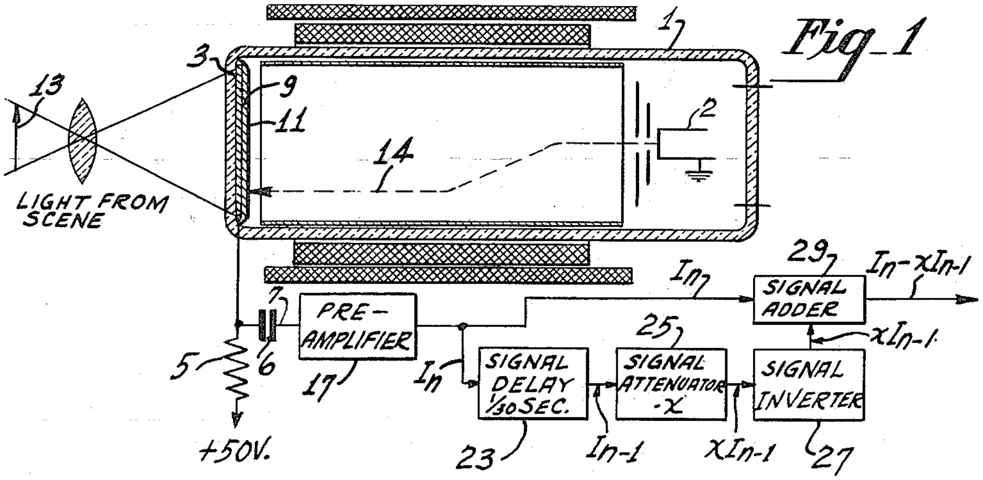
Figure 1 is a block diagram illustrating one form of this invention.

Turning now in more detail to Figure 1 there is shown a Vidicon type of pickup tube 1. The inner face of the Vidicon tube 1 has a transparent conductive coating called the signal plate 3 operated at some fixed positive potential through a fixed load resistance 5 across which the signal current 7 is taken. Superimposed on this signal plate 3 is a photoconductive coating 9 comprised of material such as selenium or antimony sulphide. Light from an object source 13 is imaged upon the photoconductive target and penetrates the photoconductive layer 9 thus creating a variation in charge across the boundary surfaces of the photoconductive layer 9 by virtue of the flow of electrons in accordance with the intensity of the light imaged thereon. The bound charges across the photoconductor 9 are released by the subsequent discharge or neutralizing effect that the scanning electron beam 14 has in the process of scanning surface 11 of the photoconductor 9. This deposit of electrons due to the neutralizing of the bound charge creates a signal by virtue of the capacitive coupling of the bound charge with the signal plate 3. This signal current produces voltage fluctuations in a load resistance connected to a source of potential. Such fluctuations are passed by the coupling condenser 6 to the first stage or preamplifier of the video amplifier. It may be noted that the cathode 2 of the Vidicon is at zero potential so that every point upon the target area scanned by the electron beam 14 is also driven to zero potential by the beam 14. Each point on the target area prior to being scanned rises by an amount proportional to the photoconductive charge which flowed during the interval between scans.

The theory of operation of such a tube has been described in a previous publication, namely "Electronics," a McGraw-Hill publication, in the article entitled "The Vidicon Photoconductive Camera Type," by Paul Weimer et al., of May 1950.

The signal current $I_n$ developed by the Vidicon 1 is first amplified by amplifier 17. The signal current $I_n$ is then conducted through two separate conducting paths. The signal current $I_n$ through one path is first delayed for a complete scanning period of 1/30 of a second by storage means 23 and attenuated by attenuator 25. It is then reversed in phase by invertor 27 and finally added in the adder 29 to the original signal conducted through the other path. The output signal represents the corrected signal current $(I_n-xI_{n-1})$, that signal represented by 15 in Figure 2.

Figure 3:
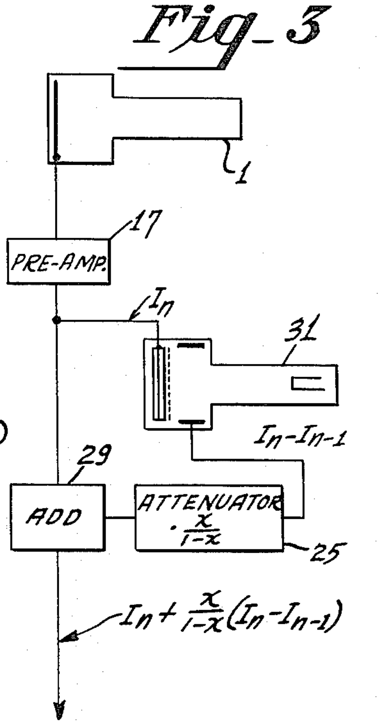
Figure 3 shows a system for delaying the signal current using an external storage type of tube.
Figure 4:
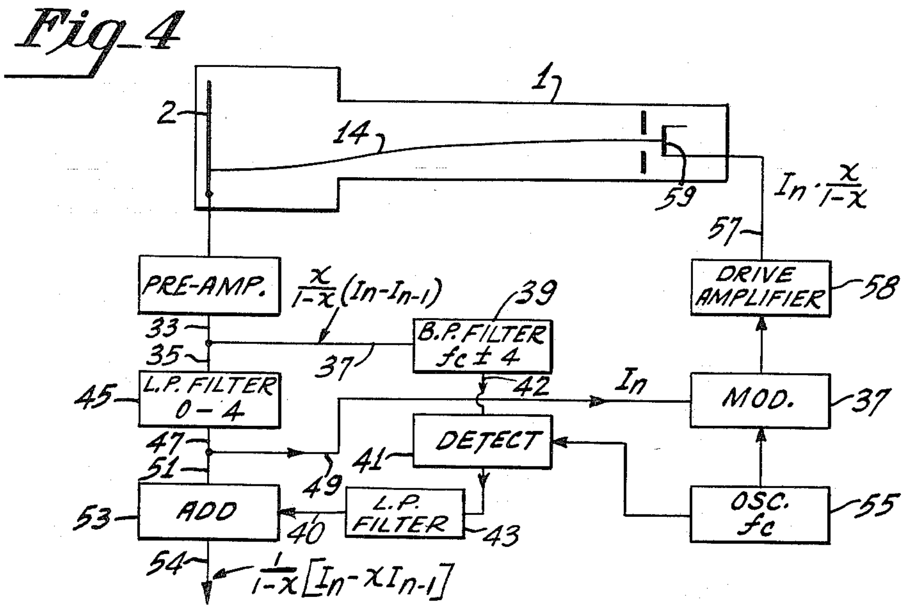
Figure 4 shows a system for delaying the signal current using the Vidicon tube for the signal delaying means.
Figure 11:
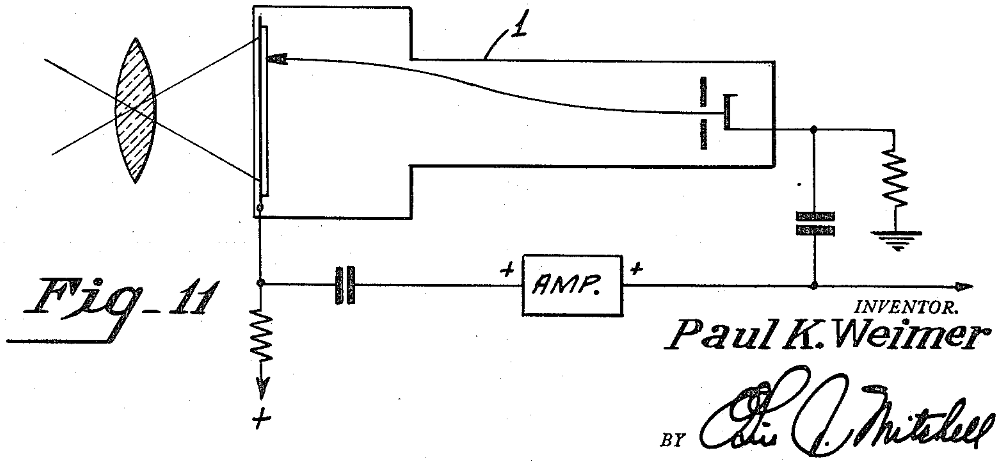
Figure 11 shows a circuit diagram for producing a corrected signal by feeding the original signal directly to the Vidicon.

The storage means 23 may take a variety of forms, such as a mercury delay line, or a magnetic tape storage system, or a storage tube system, etc. In Figure 3, to be subsequently described, a system utilizing a barrier grid type of storage tube as the required storage means in practicing the principles of the present invention is illustrated. In Figures 4 and 11, also to be subsequently described, systems utilizing the Vidicon pickup device itself as the required storage means in practicing the principles of the present invention is illustrated.

Figure 2:
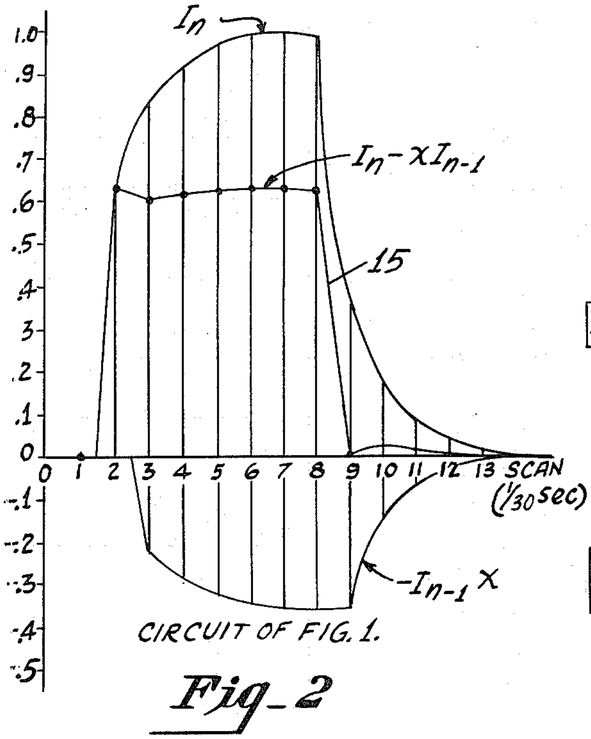
Figure 2 is illustrates graphically how the corrected signal is derived from the original and delayed signals.

Figure 2 illustrates the characteristic wave shape of the signal current for successive scanning periods wherein $I_n$ represents the instantaneous signal current for any given particular spot on the target area. In the illustration shown the light source has just been turned on immediately after the start of the second scanning period and subsequently turned off immediately after the termination of the eighth scanning period. Since the intensity of light is fixed for this period of time between the turning on and turning off of the light source, it can be seen that the signal current $I_n$ does not attain its maximum value until several successive scanning periods have taken place. Similarly, after the light source has been removed, it can be seen that the signal current $I_n$ does not fall off instantaneously but rather falls off in some slow non-linear manner. This delay in building up to its maximum value and failing to fall off instantaneously is what has been previously described as lag. To alleviate the lagging effect that the target has on the signal current, the signal current is first stored for a complete scanning period and subsequently attenuated an amount $x$, the attenuation factor depending upon the time constant of the signal delay in the particular type of pickup tube utilized. This stored signal $xI_{n-1}$ is reversed in phase by 180° and added to the original signal. The resultant curve 15 of Figure 2 represents the corrected signal current and may be expressed as $(I_n-xI_{n-1})$. The corrected signal current represented by curve 15 of Figure 2, although reduced in amplitude to some fixed amount, shows a comparatively fast rise time and a fast decay time as compared to the original signal, thus showing the desired characteristics of a signal using the type of targets which would otherwise give poor results.

Figure 3 shows another arrangement for developing a correction signal by using a barrier grid type of storage tube 31. This type of tube has been described in an article in RCA Review, volume 19, of March 1948 published by Radio Corporation of America. The output of such a storage tube is proportional to the difference between the original input signal $I_n$ and the prior stored input signal $I_{n-1}$, this previous stored signal having been stored for one complete scanning period. Such a signal may be expressed as $I_n-I_{n-1}$. However, as previously described with respect to Figure 2, such a signal must be reduced in amplitude so that the proper order of compensation desirable may be obtained. This, therefore, requires a certain degree of attenuation, this factor being equal to $$\frac{x}{1-x}$$

By adding the original signal $I_n$ and the attenuated stored signal $$\frac{x}{1-x}(I_n-I_{n-1})$$

a corrected signal necessary to compensate for the undesirable lag effect of the target will be obtainable. The corrected signal may be algebraically expressed as $$\text{Corrected signal}=I_n+\frac{x}{1-x}(I_n-I_{n-1})$$

$$\text{Corrected signal}=\frac{1}{1-x}(I_n-xI_{n-1})$$

where again the factor $x$ is determined by the lag characteristic of the target. The previous method discussed above for producing the storaging of a given signal required the use of an external storaging device such as some storage type of tube or in some cases a delay line of the mercury type. However, the Vidicon itself can be used for storing a signal for a complete scan shown by Figure 4.

Figure 4 shows a Vidicon 1 in which a developed signal $I_n$ is fed back to the cathode by amplitude modulating a fixed frequency $F_c$ generated by oscillator 55 by means of modulator 37 and drive amplifier 58. As previously described the cathode 59 of a Vidicon 1 is normally at zero potential so that the electron beam 14 emanating from such cathode 59 drives the target 2 to zero potential at whatever points the beam intercepts such target 2. However, by applying a signal to the cathode 59 the beam 14 emanating therefrom has its velocity determined by the signal impressed thereon so that as the beam 14 strikes each target elemental area it drives this area to the same potential as the potential applied to the cathode 59 at the time of scanning. This results in a signal having a negative polarity being stored upon the target 2. This stored modulated signal is combined with the picture signal imaged upon the target 2 during the next scan, thereby forming a resulting signal from which the stored component is separated by a bandpass filter 39 and detected by a detector 41. This detected signal is then further filtered by low pass filter 43 to remove the upper frequency components of the detected signal. Finally, this output signal is then added in an adder 53 to the original uncorrected signal, thus giving the final signal, corrected for lag. The actual output signal 33 from the target 2 thus represents two signals, one, the uncorrected and, two, the correcting stored signal which are separated into two paths 35 and 37. Low pass filter 45 allows only the original unmodulated signal to pass, rejecting the correcting modulated signal. This original signal is then combined with the detected correcting modulated signal in adder 53 to give a resulting corrected output signal 54. This complete system may be more clearly described by referring to Figure 5.

Figure 5:
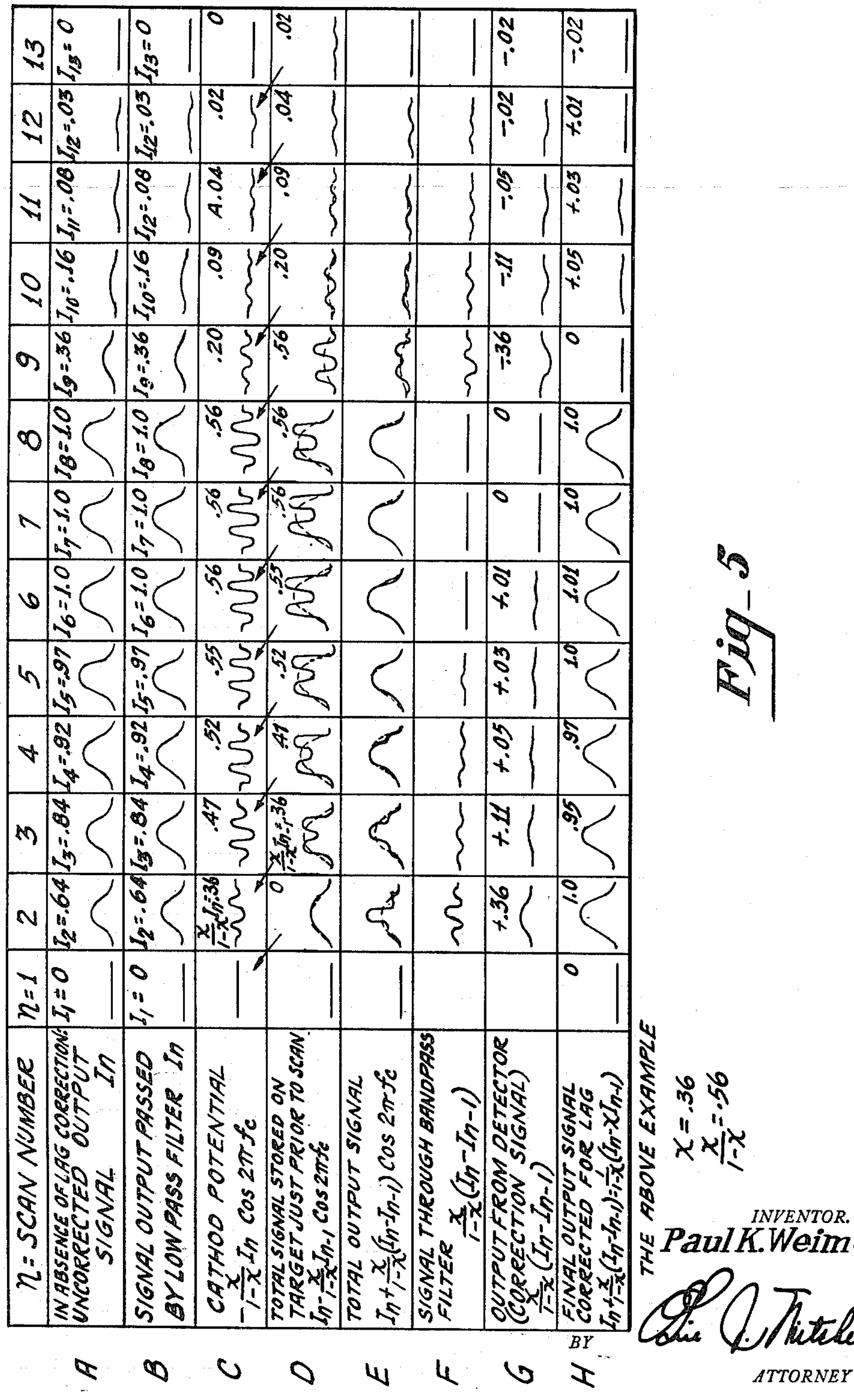
Figure 5 illustrates the component wave shapes of the system of Figure 4 and expressions for such wave shapes.

Figure 5 illustrates the various voltage wave shapes and their mathematical expressions, and how compensation for lag is accomplished by the circuit shown in Figure 4 in which the Vidicon tube itself is used simultaneously for picking up the original signal and for storing the delayed signal. Curve A shows the relative amplitudes of the original uncorrected signals for successive scanning intervals where $n$ represents the number of the scan being considered and $I_n$ the uncorrected signal (shown in Figure 4). It will be appreciated that the amplitude of this uncorrected signal $I_n$ does not reach its maximum amplitude immediately after the light source is turned on nor does the amplitude of such signal go to zero immediately after such light source has been turned off. As previously described this delaying effect of the generated signal to reach its maximum and minimum amplitude in response to the light source giving rise to such amplitude deviations was denoted as a lag. The signal plotted corresponds to that obtained when the beam scans across a narrow lighted area and is plotted as a function of time covering a period of less than one microsecond. Curve B is identical with curve A since the only signal permitted to be conducted through the low pass filter 45 is the uncorrected signal 51. To permit the separation of the original uncorrected signal 47 from the correcting signal 42 stored by the Vidicon tube 1 itself it was found desirable to feed back the correction signal as a modulation signal impressed on a high frequency oscillator in such a manner that the signal could be separated by means of filters.

Curve C of Figure 5 illustrates the wave shape of the modulated signal 57 appearing on the cathode 59. The expression for this signal may be given as $$(1)\qquad -\frac{x}{1-x}I_n \cos 2\pi fc$$

where $fc$ is the oscillator frequency of oscillator 35. The polarity of this signal is shown as negative, having an attenuation factor of $$\frac{x}{1-x}$$

The amplitude of the high frequency signal for the example considered is computed from $$\frac{x}{1-x}I_n$$

where $x$ is taken to be .36. The numerical value of this factor is indicated above each curve. The total signal stored on the target just prior to scan may be taken as the sum of the uncorrected output signal $I_n$ and the cathode potential of the preceding scan:

$$(2)\qquad I_n-\frac{x}{1-x}I_{n-1} \cos 2\pi fc$$

in which the stored signal developed by the varying cathode potential is removed during the next scanning period succeeding that period during which the cathode signal was originally stored.

Curve D of Figure 5 shows the total signal stored just prior to scan (given by Equation 2) plotted against time (or distance along the target). The solid curve represents the total resultant signal whereas the broken curve illustrated by dashed lines represents the original signal or that signal shown by curve A. The total stored signal represented by the solid portion of curve D is made up by adding curve A during one scan ($n$) and curve C during the preceding scan ($n$—1).

The total output signal 33 of Figure 4 may be represented by the expression $$(3)\qquad I_n+\frac{x}{1-x}(I_n-I_{n-1}) \cos 2\pi fc$$

wherein $I_n$ represents the original unmodulated and uncorrected signal of the $n$th scan and the remainder of this expression denotes the difference between the original modulated signal of the $n$th scan and the stored modulated signal of the preceding or ($n$—1)th scan. Both signals are attenuated by the fixed amount $$\frac{x}{1-x}$$

where the value of $x$ depends upon the degree of lag in the particular target used. The uncorrected signal $I_n$ appears in the high frequency pass band because of the direct feed-through of signal from the modulated cathode to the target. This direct signal increases as the cathode is made more negative since more electrons can land on the target and hence the $I_n$ term has opposite sign to stored signal $I_{n-1}$ which is decreased where the cathode was made more negative.

Figure 6:
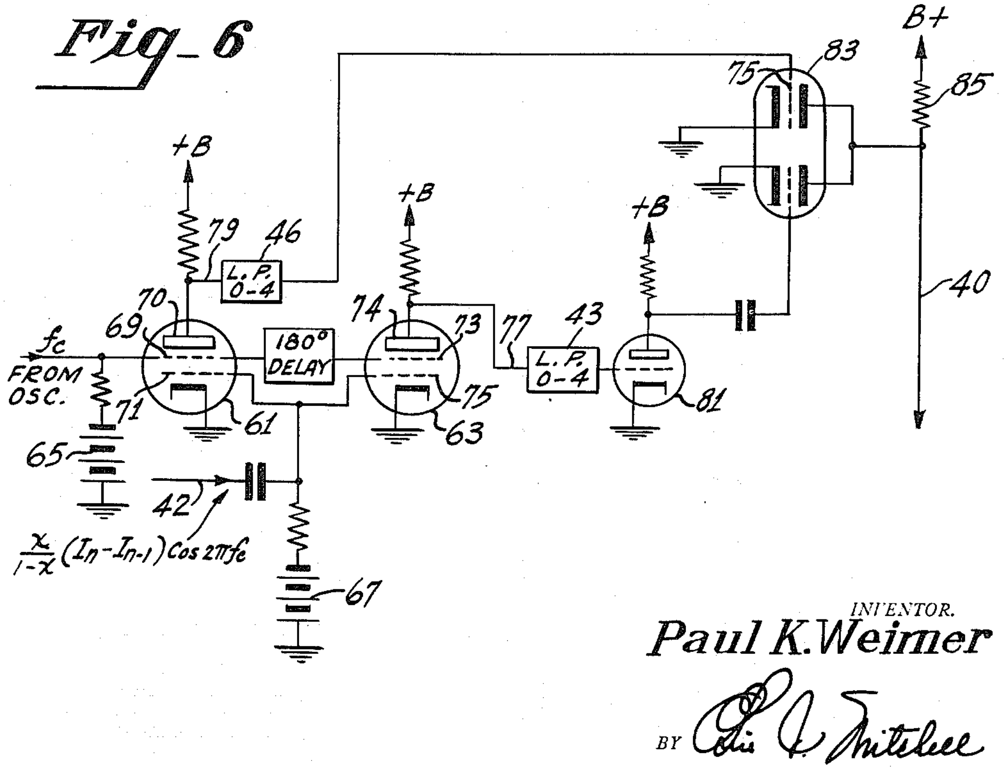
Figure 6 shows a schematic drawing for a detector and invertor for recovering the correction signal.

This total output signal given by Expression 3 is shown by the solid portion of curve E in Figure 6 and represents the difference of the solid curves C and D. A close observation of curve E shows that for the initial scans the resultant signal deviates considerably from the original unmodulated signal but for a constant signal the deviation approaches zero. Essentially this means that for the first few scans a greater degree of modulation appears but as the scanning process continues the signal currents $I_n$ and $I_{n-1}$ approach each other so that the total output signal approaches $I_n$ as shown by the above Expression 3. The signals produced during successive scans after excitation has been removed exhibit similar properties to those produced during the initial scanning period in that a greater portion of the modulating signal appears in the total output signal. However, as will be explained later, the high frequency components in the output will be displaced in phase by 180° from the high frequency signal obtained during the periods when the signal was increasing. This total output signal 37 expressed by Expression 3 above illustrated by curve E of Figure 5 is passed through a band pass filter 39 to remove the low frequency component $I_n$. The resultant signal 42 is illustrated by curve F in Figure 5. The expression for this wave is $$(4)\qquad \frac{x}{1-x}(I_n-I_{n-1}) \cos 2\pi fc$$

The first few scans, while the signal is increasing, have a greater amplitude. Similarly such increased amplitude appears during the latter scans while the signal is decreasing. The signal 42 expressed above as Equation 4 is then detected by detector 41 resulting in a wave form shown by curve G of Figure 5. It may be appreciated here that the polarity of the signal 42 during the latter scans is opposite to the polarity displayed during the first few initial scans. This reversal in polarity may be explained as follows:

During the period the signal is rising the modulated signal $$\frac{x}{x-1}I_n$$

applied to the cathode will have larger amplitude than the modulated signal $$\frac{x}{x-1}I_{n-1}$$

stored on the target during the preceding scan. During the period the signal is falling just the reverse is true. Hence, the net modulated output signal passed by the band pass filter in the former case will have opposite polarity, i. e., displaced in phase by 180°, from the output signal passed during the period the signal is decreasing. The detection process must be arranged so that the final correction signal represented by curve G must have positive polarity for one phase of the high frequency signal and negative polarity when the high frequency signal has the opposite polarity.

This may be more clearly seen by referring to the mathematical expressions during the $n$th scan. The total signal stored on the target just prior to scannnig is expressed as $$(5)\qquad I_n-\frac{x}{1-x}I_{n-1} \cos 2\pi fc$$

and the cathode potential at the $n$th scan as $$(6)\qquad -\frac{x}{1-x}I_n \cos 2\pi fc$$

Since the target goes positive with respect to the cathode voltage as such cathode voltage goes negative the modulated signal resulting from this cathode potential change has opposite polarity to the signal stored on the target. Since a negative sign was given to the stored signal a positive sign must be given to the signal resulting from the change in cathode potential. Thus, the total output signal is given by $$(7)\qquad I_n-\frac{x}{1-x}I_{n-1} \cos 2\pi fc+\frac{x}{1-x}I_n \cos 2\pi fc$$

or, combining terms, $$I_n+\frac{x}{1-x}(I_n-I_{n-1})\cos 2\pi fc \tag{8}$$

This expression is represented by curve E which may be taken as the difference between curves C and D. This output signal 37 of Figure 4 and illustrated by curve E of Figure 5 is then passed through a band pass filter 39 as previously expressed, to remove the low frequency components of the original signal. The output of filter 39 is a signal 42 having a wave form shown by curve F of Figure 5 and whose amplitude may be expressed mathematically as $$\frac{x}{1-x}(I_n-I_{n-1})\cos 2\pi fc \tag{9}$$

As expressed above this output signal 42 from band pass filter 39 is then detected to give a corrected signal necessary to compensate for the lag produced by the target. This correction signal is illustrated by curve G of Figure 5. The detection process must yield either a positive or negative correction signal depending on the phase of the high frequency correction signal applied to it.

Figure 6 shows a circuit for detecting the modulated signal to produce an output correcting signal. Tubes 61 and 63 are tetrodes in which their corresponding control grids 69 and 71 of tube 61 and 73, 75 of tube 63 are so biased that conduction will only take place when both grids of each tube are positive. This means that the signal 42 from band pass amplifier 39 will be mixed with the oscillator frequency *fc* only when both signals are positive.

Figure 7:
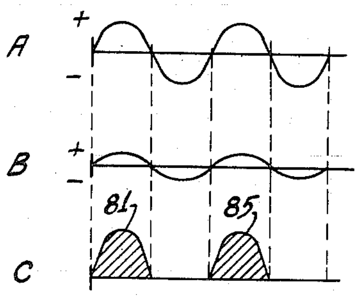
Figures 7, 8, 9 and 10 illustrate the various wave forms associated with detector of Figure 6.
Figure 8:
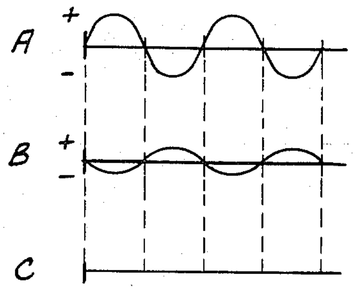

Figures 7, 8, 9 and 10 show the operation of the detector in Figure 6. Curve A of Figure 7 represents the modulated signal 42 applied to grid 71 of tube 61, as the original $I_n$ signal is increasing. Curve B represents the oscillator signal *fc* fed to grid 69. Curve C represents the current to plate 70, such current flowing only during the intervals where curves A and B are positive, shown by shaded areas 81 and 83. This same signal 42 is also applied to grid 75 of tube 63. However, the oscillator frequency *fc* is fed to grid 73, 180° out of phase with that signal fed to grid 69. Hence, by observing Figure 8 it can be seen that no plate current will flow since curves A and B are never positive simultaneously.

Figure 9:
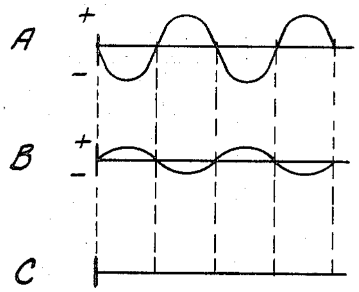
Figure 10:
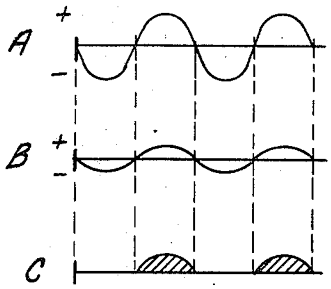

Figures 9 and 10 show the operation of the detector for a decreasing $I_n$ signal. As the original signal decreases, the modulated signal goes negative as previously described and illustrated by curve A of Figure 9. Since the polarity of the oscillator frequency *fc* is opposite no plate current will flow. However, plate current will flow in plate 74 by virtue of the 180° phase shift of *fc* and shown by curve B of Figure 10. It will be observed that the plate current shown by curve C of Figure 10 is positive, whereas a negative polarity is desired so that by adding this signal to the original decreasing uncorrected signal a faster decay of the original signal will result. The polarity inversion is performed by some inverting device as shown by 81 of Figure 6.

Further reference to Figure 6 shows that after the mixing of the oscillator frequency *fc* with the signal 42 from bandpass filter 39, the high frequency components are removed by low pass filters 43 and 46 and the remaining low frequency components are added by amplifier 83.

The output signal 40, from detector 41 is then combined in an adder to produce a final output signal corrected for lag. The detected output signal may be expressed as $$\frac{x}{1-x}(I_n-I_{n-1}) \tag{10}$$

and the final output signal corrected for lag may be expressed as $$\frac{1}{1-x}(I_n-xI_{n-1}) \tag{11}$$

It was previously explained that it was preferred to feed back the uncorrected signal to the cathode as a modulated high frequency signal so that the stored signal could be readily separated from the uncorrected signal by means of filters. However, a simpler arrangement shown in Figure 11 may under certain conditions provide adequate correction for lag.

Figure 11 shows schematically a circuit arrangement for accomplishing a lag correction using the Vidicon itself as a storaging means and feeding back the uncorrected signal to the cathode with such a polarity that the cathode is driven negative in the positive or light areas of the target. This results in an increased deposit of electrons by the low velocity beam during the initial scans when the signal is rising and reduced deposit of electrons during the later scans when the signal is falling, providing an approximate correction for lag. It is necessary for best compensation to properly control the amplitude of this signal being fed back so that the resulting corrected signal will be of the proper proportion necessary to effect best compensation.

Having thus described the invention, what is claimed is:

1. In a television image pickup system operating at a predetermined frame repetition rate and including an image pickup tube comprising a light responsive target, means for generating an electron beam, deflection means for causing said beam to trace a scanning raster on said target, and means for imaging a scene to be televised on said light responsive target, a lag compensation system comprising means for deriving uncorrected video signals nominally representative of said scene from said target in response to the tracing of said scanning raster thereon, means for storing signals for a period of time substantially corresponding to the duration of one of said frames, means for applying the uncorrected video signal output of said signal deriving means to said signal storing means, and means for combining the uncorrected video signal output of said signal deriving means with video signals stored for said period by said storing means in mutual phase opposition to produce a lag compensated video signal output.

2. A lag compensation system in accordance with claim 1 wherein said signal storing means includes a source of oscillations, means coupled to said oscillation source and to said signal deriving means for modulating said oscillations in amplitude in accordance with said uncorrected video signals, means for velocity modulating said pickup tube beam in accordance with said modulated oscillations, means for deriving signals representative of said modulated oscillations from said target in response to the tracing of a scanning raster on said target, and amplitude detecting means coupled to said last named signal deriving means for recovering from said modulated oscillation representative signals a stored replica of said uncorrected video signals.

3. Apparatus in accordance with claim 1 wherein said signal storing means comprises a storage tube of the barrier grid type.

4. Apparatus in accordance with claim 1 wherein said signal storing means comprises said pickup tube, and wherein said signal applying means comprises signal transfer means coupled between said target and said beam generating means.

References Cited in the file of this patent

UNITED STATES PATENTS

| | | |
|---|---|---|
| 2,177,366 | Iams | Oct. 24, 1939 |
| 2,197,863 | Iams | Apr. 23, 1940 |
| 2,226,459 | Bingley | Dec. 24, 1940 |
| 2,243,079 | Blumlein | May 27, 1941 |
| 2,273,172 | Beers | Feb. 17, 1942 |
| 2,321,611 | Moynihan | June 15, 1943 |
| 2,404,173 | Hansen | July 16, 1946 |